Figure 1:
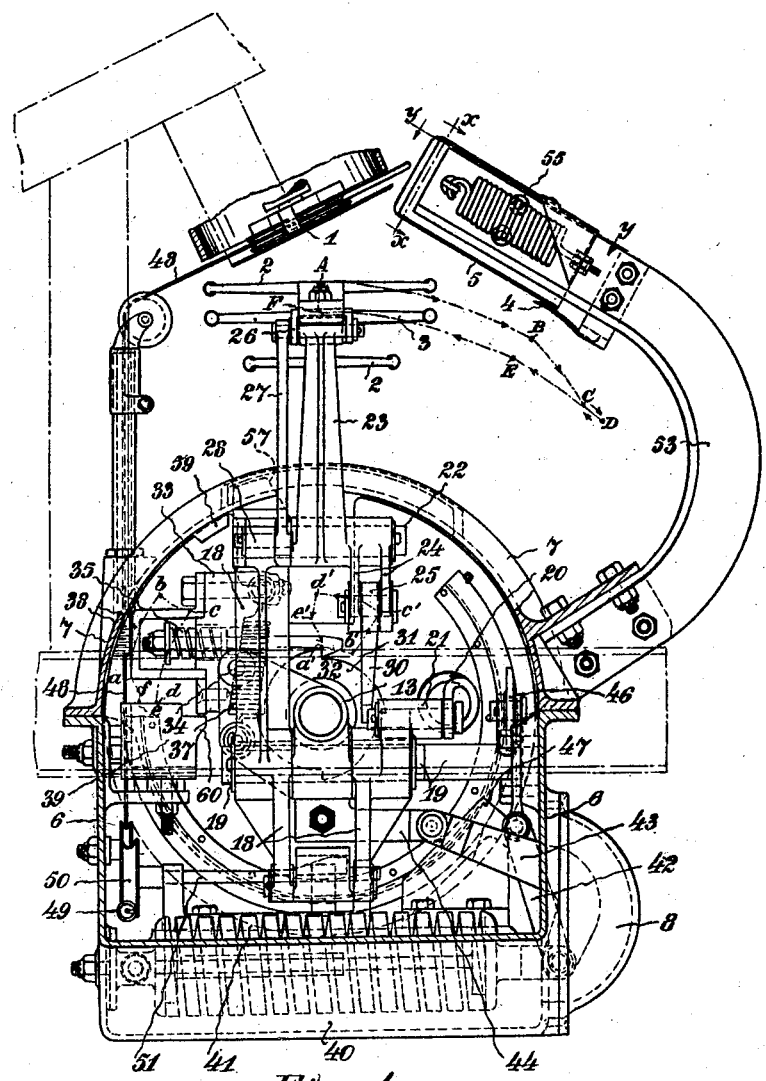

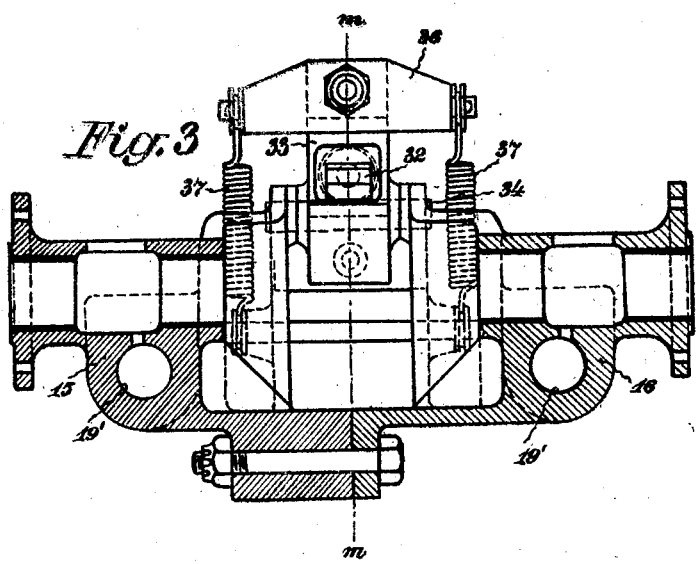
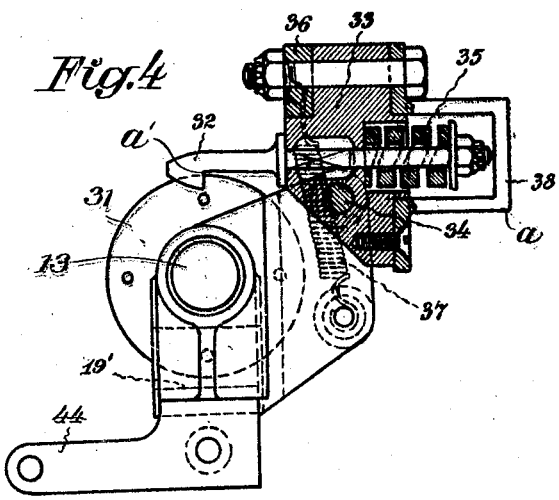

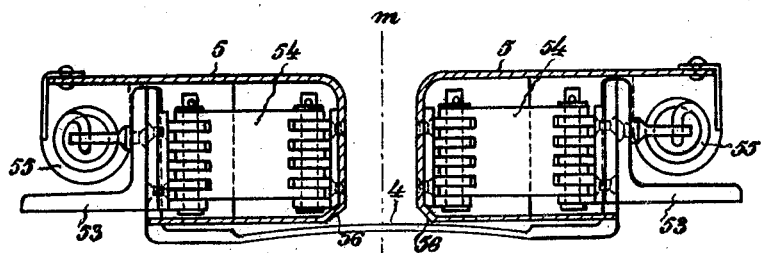
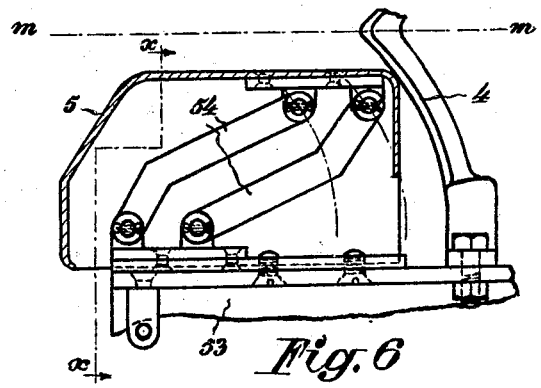
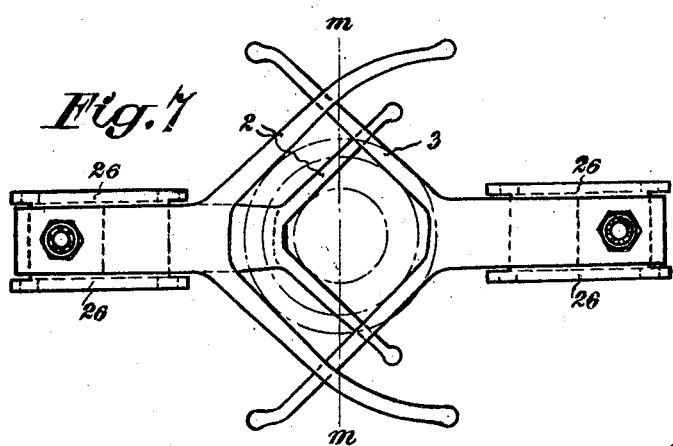

Patented Feb. 3, 1925.

1,525,347

UNITED STATES PATENT OFFICE.

OTTO GOTTFRIED WELLTON, OF MALMO, SWEDEN.

BEET HARVESTER.

Application filed October 18, 1923. Serial No. 669,371.

*To all whom it may concern:*

Be it known that I, OTTO GOTTFRIED WELLTON, a citizen of Sweden, and residing at Malmo, in the county of Malmohus, Kingdom of Sweden, have invented a new and useful Improvement in Beet Harvesters, of which the following is a specification.

In beet harvesters it is already known for the purpose of cutting off the tops of the beets to use a pair of gripping arms movable towards and from each other for gripping the beets, which after having been digged out of the ground are conveyed towards the top cutting device by means of a suitable conveyor supporting the beets for instance by gripping their tops, the aforementioned gripping arms also being movable together for the purpose of conveying the beets towards a topping knife. It is true that in this known arrangement means for guiding the beets, during their travel towards the knife, have been used, but these guiding means and the whole construction for the rest have not been of such a kind that the beets independently of their size and shape and especially independently of the position, in which they arrive at the gripping arms, have been automatically adjusted into such a position that they are cut off at the right place.

My present invention refers, however, to an improvement in such known top cutting devices and the object of the invention is automatically to adjust the position of the beets, when carried forward by the gripping arms, in such a way that they are always cut off at the right place leaving no part of the top adhering to the beet itself and cutting off no more of the latter than necessary. This novel and—as will easily be understood—very important effect according to the invention is obtained mainly by constructing the gripping arms in such a way and placing the guiding means for the beets in such a position relatively to the path of movement of the former that the beet, after having been caught by the gripping arms, on account of the centrifugal force acting upon the same during its travel towards the knife is free to slide outwardly within the gripping means towards the guiding means, which stop such outward slide and ensure the exact position of the beet. In order to facilitate and improve the aforementioned effect the beet guiding means besides are constructed in such a way that they automatically adjust themselves in conformity to beets of different sizes in order to stop the different beets in their outward slide so that their tops are positioned substantially in the same way in relation to the top cutting knife, whereby the cut is always carried out at the correct place.

A further object of the invention is also to provide an improved construction of the character described which is very reliable in use and capable of enduring rough working conditions.

Figure 2:
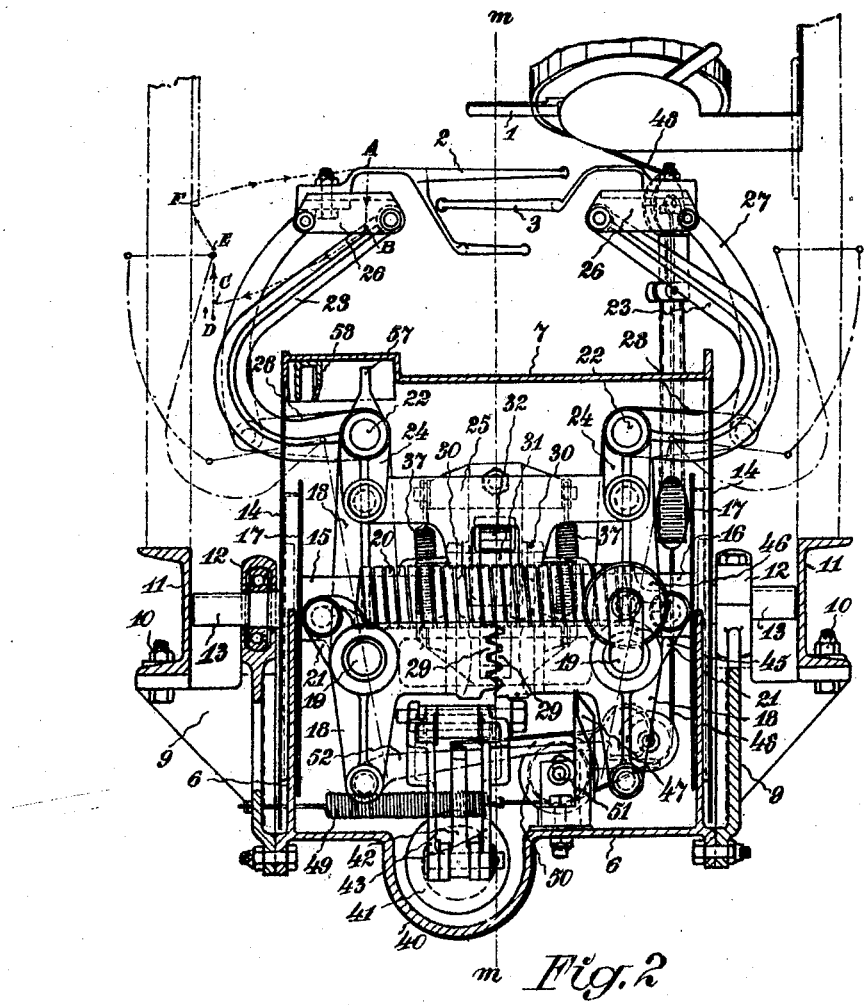

The invention is illustrated in the accompanying drawings, in which Figs. 1 and 2 show vertical sections through the top cutting device taken at right angles to each other. Figs. 3 and 4 in a larger scale show two sections through a detail more particularly described below taken at right angle to each other. Fig. 5 is a section along the line $x$—$x$ in Figs. 1 and 6, and Fig. 6 is a section along the line $y$—$y$ in Fig. 1. Fig. 7 shows the gripping means seen from above. Also the Figs. 5–7 are drawn in a larger scale than Figs. 1 and 2.

In order to facilitate the understanding of the construction and working of the apparatus more particularly disclosed in the following it is advisable to start with a short description of the procedure when cutting off the tops. The beets after having been loosened or digged out of the ground are conveyed upwards, for instance by means of a pair of coacting, parallel and endless rubber belts running over rollers, such belts gripping between them the tops of the beets, and during the travel the tops of the beets abut against a releasing arm 1 which then is caused to turn and release the gripping mechanism so that the latter, when thus set in action, causes its gripping members 2 and 3 to surround the beet. After the beet has thus been gripped the gripping members and the arms carrying the latter are swung into the position shown in full lines in Figs. 1 and 2 and previous to the releasing and gripping action referred to above they have been in the position diagrammatically indicated in dot and dash lines in Fig. 2. The beet thus kept gripped is carried towards the knife 4 and on account of the centrifugal force arising from the swinging movement it slides outwardly surrounded by the gripping members and abuts against the guiding means 5 which stop the outward slide. By this sliding movement within the cage formed by the gripping members the beet independent of size and shape and independent of the position, in which it arrives at the gripping members, is automatically brought into a correct position relatively to the knife before arriving at the latter. It is obvious that this effect will be dependent as well on the construction of the gripping members, which must permit the slide in question, as on the relative arrangement of the gripping members and the guide means, so that the beet is given sufficient time and opportunity to slide in the required manner. Thus, it is also evident that the invention is substantially to be found in the fact that the device or apparatus for the purpose specified is arranged to act in a certain novel way for cutting off the tops at the correct place and therefore the construction in a certain degree is dependent on the manner of action. Consequently all constructions embodying the novel idea in question are included in the invention and the latter is not limited to the form, which for the sake of explanation is shown in the drawings, although it involves several advantages more particularly disclosed in the following.

For simplifying the description of the form shown it is to be remarked from the beginning that the particulars are substantially symmetrical in relation to the central plane $m-m$ shown in Figs. 2, 3 and 5–7.

All of the means essential for effecting the required movements are enclosed within a casing which partly may be filled with a suitable lubricant whereby dirt and earth are prevented from intruding and the movable members are kept satisfactorily lubricated. The casing consists of a lower part 6 and a cover 7 closing the same from above, a smaller cover or lid 8 being arranged on the side of said lower part in order to facilitate the assemblance of the construction. Brackets 9 are arranged on the sides of the casing for the purpose by means of bolts 10 to support the same in the framing 11 of the beet harvesting machine said brackets also serving the purpose of supporting the bearings 12 for a driving shaft 13 traversing the casing. Circular plates 14 forming end walls of the casing are rotatorily mounted on said shaft together with a sleeve 15, 16 built up from two parts connected at the middle of the length of the shaft. By these means the apertures in the end plates for extending the arms carrying the gripping members 2, 3 and rocking together with the aforementioned sleeve around the shaft 13 need to be small only. Plate strips 17 (Fig. 2), Z-shaped in cross section, are fixed to the inner side of the end plates for preventing the leakage of the lubricant.

Levers 18 are mounted on shafts 19 located in right angles to the shaft 13 and surrounded by the bearings 19' (Figs. 3 and 4) within the sleeve 15, 16 said levers being above their fulcrums connected together by means of a strong coiled spring 20 affixed to pins arranged on upwardly inclined arms 21 on the levers 18. At the upper end of each of these latter a lever is pivotally mounted on a pin 22, one arm 23 of said lever extending through an aperture in the adjacent end plate the other arm 24 being shorter and extending downwardly from the pin 22. Both of the shorter arms 24 at their lower ends are connected to each other by means of a cross piece 25. At their upper ends each of the arms 23 is pivotally connected with a fixing member 26 for each of the gripping members 2 and 3, each of said fixing members being also pivotally connected with the upper end of a link 27 and each of said links at its lower end is pivotally connected with an arm 28 fixed to the lever 18 and extending through the aperture in the adjacent end plate. By this mechanism the fixing members 26 and the gripping members 2, 3 are guided substantially parallel to each other and a relatively large movement of the gripping members corresponds to a small change in the length of the spring 20, which is advantageous. Toothed segments 29 are rigidly secured to the arms 18 and placed into mesh with each other and the cross piece 25 is provided with a fork-shaped guiding member 30 straddling a toothed wheel 31 affixed to the shaft 13 (Fig. 2), so that the levers 18 and the connecting mechanism described above must always take a symmetrical position in relation to the middle plane $m-m$. By the construction described the gripping members, in spite of the general rigidity of the mechanism, in a certain degree are given a resilient gripping action which is advantageous to the function of the apparatus. Besides the larger beets are kept more fixed than the smaller ones, this effect being reached on account of the fact that the inclined position of the arms 21 supporting the spring 20 causes the fixing points of the spring, when supporting beets of different sizes, to be advanced towards or withdrawn from the shaft 19.

By a correct selection of the angle between the levers 18 and the arms 21 the spring 20 may be caused to have the greatest turning action on the levers 18 when they are in the position corresponding to the gripping of the largest beets and it has been found that the suitable angle is about 45°. The maximal turning moment is then applied to the largest beets, but also these beets must have a slide, which means that the arms must be able to be further separated, and then it is of course advantageous if the turning moment has passed its maximal value and is diminished when the further separation of the arms takes place.

As previously mentioned a toothed wheel 31 is affixed to the shaft 13 and said wheel coacts with a catch hook 32 arranged on a block 33 pivotally mounted on the sleeve 15, 16 by means of a shaft 34 parallel to the shaft 13. The hook 32 is mounted in a recess in the block 33 and is kept in its place by means of a spring 35, so that it may be able to give and take and thereby to reduce the shock when the hook is brought into engagement with the toothed wheel 31, as more particularly disclosed below. A fixing member 36 is arranged on the block 33 for the purpose of affixing a pair of springs 37, the other ends of said springs, the purpose of which will be more particularly described in the following, being affixed to the sleeve 15, 16. On the block 33 is also arranged a stirrup 38 surrounding the spring and the rear end of the hook 32, said stirrup being adapted to coact with a block or abutment 39 fixed to the casing.

An expansive spring 41 is arranged in a trough-shaped portion 40 at the bottom of the casing and said spring at its one end has a seat on said casing the other end of the same being seated on a guiding link 42 serving the purpose of keeping the spring in its proper place. This latter end of the spring is also connected with a pair of links 43, the opposite ends of which are connected to a stud 44 on the sleeve 15, 16. A fork-shaped arm 45 is arranged on one of the shafts 19 said arm carrying a roller 46 coacting with the inclined edge of a plate 47. The purpose of this mechanism will be described in the following.

The releasing arm 1 mentioned above is connected to a wire 48 which, guided by suitable rollers, is carried into the casing and affixed to a spring 49 serving the purpose of keeping the wire under tension and taking it back into its original position. The wire 48 runs over a roller 50 on a spindle 51 provided with a cam or the like for releasing the spring actuated catch hook 52 serving the purpose of locking together the levers in the manner described below with reference to the working of the mechanism.

On the casing is affixed a pair of arc-shaped arms 53 (one of which is shown in Fig. 1) each of said arms supporting one of the beet guiding means 5 said guiding means being placed at a suitable distance from each other and each of them consists of a plate casing (Figs. 5 and 6) which is pivotally connected to the free end of each arm 53 in such a manner that they are able within a certain degree to be separated from or advanced towards each other. For this purpose the beet guiding means or plates are supported by links 54 and they are kept at a minimal distance from each other by means of springs 55 but may be pushed further apart by means of the beets passing between them. The guiding plates at their lower edges are provided with a surface 56 inclining about 30° in relation to the bottom faces of said plates, the upper end of the beet proper being intended to abut against said inclining surfaces when guided by the guiding plates, the tops passing between said plates. The mechanism is of such a kind that an increased distance between the guiding plates (i. e. when larger beets pass between them) corresponds to an increased pressure on the top end of the beets. The proportion between the smallest and the greatest resistance from the springs with regard to the movement of the guiding plates, when pushing them apart, as well as the proportion between the smallest and greatest distance between said plates has been found suitable when chosen 1:3.

The topping knife 4 is arranged behind the guiding plates. It is V-shaped and very thin and curved in conformity to the surface of a sphere the centre of which is located on the axis 13.

The gripping members 2, 3 consist of forks of which the former is a double fork, the latter being a single one gripping the beets between the gripping points of the former. By this construction the beet is given the possibility to slide outwardly between the forks. The prongs of the forks are inclined about 90° in relation to each other (compare Fig. 7) and thereby the beets are kept rather fixed without being prevented from sliding.

In order to describe the manner of action of the complete apparatus described above reference is to be had to the dot and dash line diagram A—B—C—D—E—F (Figs. 1 and 2) corresponding to the path of movement of the point A on the gripping member 2, a second diagram $a$—$b$—$c$—$d$—$e$—$f$ (Fig. 1), which is the path of movement of the point $a$ on the stirrup 38, and a third diagram $a'$—$b'$—$c'$—$d'$—$e'$ (Fig. 1) showing the path of movement of the point $a'$ on the catch hook 32.

In the initial position the gripping arms are located as shown in dot and dash lines in Fig. 2, the spring 41 is out of action, the catch hook is in the position $c'$, when the point $a$ of the stirrup is at $f$ so that the springs 37 tend to bring the hook 32, the block 33 and the stirrup 38 in the positions shown in the drawings, and this latter movement is prevented by the lower edge of the stirrup 38 which abuts against the edge 60 of the block 39. In order to carry the catch hook into engagement with the toothed wheel 31, which is continually rotated together with the shaft 13, the arms 18 must be turned in a clockwise direction around the shaft 13.

This turning movement can be effected after the gripping members have caught the beet only, since one of the levers 18 in its outer position by means of an arm 57 on its upper end abuts against a stopping surface on the end of a groove 58 arranged on the inner side of the cover 7. The arms, as aforesaid, are in their outer positions until a beet is carried forward so that it turns the releasing arm 1, whereby the catch hook 52—previously holding the levers 18 locked together—is released, so that said levers and arms by means of the spring 20 are brought into the position shown in full lines in the drawing, and then the beet is caught by the gripping members. Since the beet is thus gripped, when carried forward by the conveying means (not shown), the arms and the gripping mechanism as a whole by means of the beet are turned a little angle around the shaft 13 so that the lower edge of the stirrup 38 may be able to pass the abutting edge 60 of the block 39. The catch hook 32 is then brought into engagement with the toothed wheel 31 causing the sleeve 15, 16 together with the levers 18 and the gripping means to be turned further together with the continuously rotating shaft 13. The beet by means of the gripping members is then carried towards the topping knife 4 whereby the former, on account of the centrifugal force, slides outwardly towards the guide plates 5, which are then automatically pushed apart in conformity to the size of the beet, so that the same under all conditions is carried against the knife in a correct position for cutting off the top at the proper place. During this movement the spring 41 is put under tension by means of the links 43, and the sleeve 15, 16 together with the particulars connected thereto continues in turning around the shaft 13 until the stirrup 38 strikes a cross piece 59 arranged on the inner side of the cover 7 such cross piece thereby preventing the further turning movement of the stirrup. Then the result is that the catch hook 32, the block 33 and the stirrup 38 are caused to turn around the shaft 34 penetrating said block, said turning movement being performed against the action of the springs 37 which latter, however, will soon pass to the other side of the shaft 34 and thereby impart to the block 33 an oppositely directed turning moment. The sleeve 15, 16 together with the levers 18 &c. on account of the inertia will continue in turning in the same direction whereby the tension of the spring 41 is further increased until the same finally stops the movement, which latter, however, is limited by the arm 57 moving in a groove 58 on the inner side of the cover 7. During the last portion of the movement described above the top has been cut off and the gripping members have been pushed apart for loosening the beet, such loosening being effected by the roller 46 abutting against the inclined edge of the plate 47. When the gripping members are pushed apart the catch hook 52 comes into action and locks the gripping mechanism in the open position referred to above. The spring 41, which previously has taken up the whole amount of energy during the movement, is now expanded and carries the members back to their initial positions. During the last part of the return movement the stirrup 38 strikes the block 39 at $d$ and slides along the same to $e$, whereafter the springs 37 again pass to the other side of the shaft 34 the stirrup thereby being lifted to $f$, so that the lower edge of the stirrup is again pressed against the edge 60 of the block 39. The catch hook 32 can thus not come into engagement with the wheel 31, but the block 33 with the springs 37 under tension and the hook 38 immediately above the wheel is ready—when the next releasing action takes place—to be at once set into action in the manner described.

The diagrams $a$—$b$—$c$—$d$—$e$—$f$—$a$ and $a'$—$b'$—$c'$—$d'$—$e'$—$a'$ give a clear understanding of the manner of working and are to be read thus:—The movement of the point $a'$ from $a'$ to $b'$ represents the period of engagement and during this period the point $a$ moves from $a$ to $b$. The parts $b$—$c$ and $b'$—$c'$ represent the paths of movement when releasing the engagement and the parts $c$—$d$ and $c'$—$d'$ the return movement. The parts $d$—$e$—$f$ and $d'$—$e'$ correspond to the movement during which the moment of torsion of the block 33 caused by the springs 37 changes its direction. The parts $f$—$a$ and $e'$—$a'$ again represent the engagement.

The diagram A—B—C—D—E—F—A is to be understood this way:—The point A (left gripper) moves along A—B towards B until the roller 46 strikes the inclined edge of the plate 47 and opens the gripping forks, whereafter the point A describes the opening movement B—C. The path C—D indicates that the inclined edge corresponds with the plane of rotation of the gripping mechanism so that the opening movement is concluded. The return path D—C—E shows that the hook 52 has locked the gripping mechanism in the open position and E—F that the arm 57 on the lever 18 has been caught by the flanges of the groove 58 so that the gripping members are further pushed apart. The purpose of guiding the levers in this way is to obtain a braking effect on the turning movement around the shaft 13 and to prevent a releasing of the gripping arms in any other position than the initial one in case the beets are conveyed to the apparatus with a too small interspace whereby the hook 52 would be released before the members have returned to their initial positions. The releasing of the gripping arms is thus not entirely dependent on the hook 52, but they cannot be released before they have returned to the initial position. The path F—A corresponds to the gripping of the beet.

It is advantageous that a larger beet is kept gripped during a longer time, when cutting off its top, since the same on account of its size occupies a larger cutting arc, which is the arc-shaped path of movement described by the upper end of the beet itself before it is completely cut off. In other words, the opening of the gripping forks ought to be effected later when cutting large beets than when cutting smaller ones, and this demand is completely fulfilled. The opening of the forks at a later stage when cutting larger beets has its reason in the fact that the opening is effected by coaction of the roller 46 and the inclined edge of the plate 47. The diagram A—B—C—D—E—F (Fig.1), showing the path of movement of the gripping arms when gripping a beet of general size, gives a clear idea of this fact. The location of the arc A—B in the diagram is determined by the size of the beet under treatment and the larger the beet the more the arc is neared to its centre. Consequently the larger the beet the more the point B of intersection between the arcs A—B and B—C is neared towards C and therefore the opening of the forks, beginning in the point B, is delayed in conformity to the increasing size of the beets. The corresponding change in the diagram in Fig. 2 is to be found in a displacement of the line A—B outwardly and downwardly, such displacement being also increased in conformity to the increasing size of the beets.

Although the construction described above has been found very efficient and reliable in practice the invention is not limited to the particulars described for the purpose of explanation and equivalent means of varying constructions may be used instead of almost all of the particulars described. Especially it is to be pointed out that the top cutting device is generally independent of the manner in which the beets are conveyed to the gripping members and of the means used therefor and for this purpose conveyors of any suitable kind may be used.

What I claim is:—

1. Improvement in beet harvesters comprising a pair of arms carrying gripping members for gripping the beet, means for rocking said members together around a common centre and means for moving the same towards and from each other in the vicinity of the ends of said rocking movement, a topping knife arranged at the outside of the arc-shaped path of movement of the gripping members and the beet gripped thereby, and guide means arranged adjacent to said topping knife, the aforementioned gripping members being of such a construction as to permit an outward slide of the gripped beet towards the guide means when acted upon by the centrifugal force arising during the rocking movement.

2. Improvement in beet harvesters comprising a pair of arms carrying gripping members for gripping the beet, means for rocking said members together around a common centre and means for moving the same towards each other in the vicinity of one end of such rocking movement and from each other in the vicinity of the other end thereof, a topping knife arranged at the outside of the arc-shaped path of movement of the gripping members and the beet gripped thereby, a pair of guide plates arranged adjacent to said topping knife, springs acting upon said guide plates for keeping them at a certain minimal distance from each other but permitting them to be pushed apart when acted upon by the top of the beet, the aforementioned gripping members being of such a construction as to permit an outward slide of the gripped beet towards said guide plates when acted upon by the centrifugal force arising during the rocking movement.

3. Improvement in beet harvesters comprising a pair of arms pivotally mounted on a common axis of rotation, means for rocking said arms around said axis, a gripping member arranged on each of said arms, both of said gripping members coacting for the purpose of gripping the beet and being of such a construction as to permit an outward slide of the same when gripped and rocked, a spring-actuated guide means arranged at each side of the arc-shaped path of movement of the beet when rocked, said guide means serving as stoppers for limiting said outward slide, a topping knife arranged adjacent to said guide means, means for advancing the gripping members towards each other in the vicinity of one end of said rocking movement and for separating the same in the vicinity of the other end thereof, means for locking the gripping members in the separated position and releasing means actuated by the beets and intended for releasing said locking means when the beets are conveyed into a position to be gripped by the gripping members.

4. Improvement in beet harvesters comprising a pair of arms pivotally mounted around a common axis, means for rocking said arms around said axis, a gripping member arranged on each of said arms, both of said gripping members coacting for the purpose of gripping the beets and being of such a construction as to permit an outward slide of the same when gripped and rocked, a spring actuated guide plate arranged at each side of the arc-shaped path of movement of the beets when rocked, such plates having an inclined edge facing the rocking centre, parallel links supporting each of said guide plates so that they may be automatically adjusted relatively to each other on account of the springs as thereby to serve as stoppers for the outward slide of the beets, a V-shaped cutting knife arranged adjacent to said guide plates and curved in conformity to a sphere, the centre of which is located at the rocking centre, means for advancing the gripping members towards each other in the vicinity of one end of said rocking movement and separating the same in the vicinity of the other end thereof, means for locking the gripping members in the separated position and releasing means actuated by the beets and intended for releasing said locking means when the beets are conveyed into a position to be gripped by the gripping members.

5. Improvement in beet harvesters comprising a sleeve pivotally mounted on a shaft, a pair of arms pivotally mounted on shafts journalled within said sleeve and placed in right angle to the first-mentioned shaft, a lever pivotally mounted on each of said arms and carrying at the upper end a fork-shaped beet gripping member, interconnecting means arranged between the lower ends of said levers, means for jointly rocking said sleeve and arms around the first mentioned shaft and means for separately rocking the arms around each of the last mentioned shafts, means for positively guiding the arms and levers in such a way that the gripping members are advanced towards each other in the vicinity of one end of the joint rocking movement around the first-mentioned shaft and separated from each other in the vicinity of the other end thereof, a topping knife arranged at the outside of the arc-shaped path of movement described by the gripping members during the last mentioned rocking movement and spring actuated and automatically adjustable guide means arranged adjacent to said topping knife, the aforementioned gripping members being of such a construction as to permit an outward slide of the beets when gripped and the guide means being intended to limit such outward slide and to ensure a correct position of the beets in relation to the topping knife.

6. Improvement in beet harvesters comprising a sleeve pivotally mounted on a shaft, a pair of arms pivotally mounted on shafts journalled within said sleeve and placed in right angle to the first-mentioned shaft, toothed segments affixed to said arms and placed into mesh with each other, a link and lever system pivotally mounted on each of said arms and carrying at the upper end a fork-shaped gripping member, interconnecting means arranged between the lower ends of said link and lever systems, a spring tending to advance the gripping members towards each other when released, means for jointly rocking the sleeve and the arms around the first mentioned shaft in one direction and a spring counteracting such rocking movement and tending to carry the parts back when released, means for separately rocking the arms around each of the last mentioned shafts and means for positively guiding the arms and lever systems during the joint rocking movement in such a manner that the gripping members are resiliently advanced towards each other in the vicinity of one end of the same and separated from each other in the vicinity of the other end thereof, a V-shaped and curved topping knife arranged at the outside of the arc-shaped path of movement described during the joint rocking movement, spring actuated and automatically adjustable guide plates having an inclined edge facing the rocking centre and arranged adjacent to said topping knife, such guide plates serving as stoppers for an outward slide of the beets permitted by the gripping members, means for locking the gripping members in the separated position and releasing means actuated by the beets and intended for releasing said locking means when the beets are conveyed into a position to be gripped by the gripping members.

7. Improvement in beet harvesters comprising a sleeve pivotally mounted on a shaft, a pair of arms pivotally mounted on shafts journalled within said sleeve and placed in right angle to the first mentioned shaft, a toothed wheel affixed to said first mentioned shaft and continually rotating therewith, a releasable catch hook connected to said sleeve and coacting with said toothed wheel for jointly turning the arms around the sleeve shaft, a spring counteracting said turning movement and serving the purpose of turning the sleeve and arms back to their initial positions, a link and lever system pivotally mounted on each of said arms and carrying at the upper ends a fork-shaped gripping member for the beets, an interconnecting link arranged between the lower ends of said link and lever systems, a fork-shaped member connected with said link and straddling the toothed wheel, means for separately rocking the arms around their individual shafts, means for positively guiding the arms and levers in such a way that the gripping members are advanced towards each other in the vicinity of one end of the joint turning movement and separated from each other in the vicinity of the other end thereof, a topping knife arranged at the outside of the arc-shaped path of movement of the gripping members during the last mentioned turning movement and automatically adjustable resilient guide plates arranged adjacent to said topping knife, the aforementioned gripping members being of such a construction as to permit an outward slide of the beets when gripped thereby and the guide plates being intended to limit such outward slide and to ensure a correct position of the beets in relation to the topping knife.

In testimony whereof, I have signed my name to this specification in the presence of two subscribing witnesses.

OTTO GOTTFRIED WELLTON.

Witnesses:
VERNER CARLSSON,
G. PETERSSON.